Patented June 20, 1950

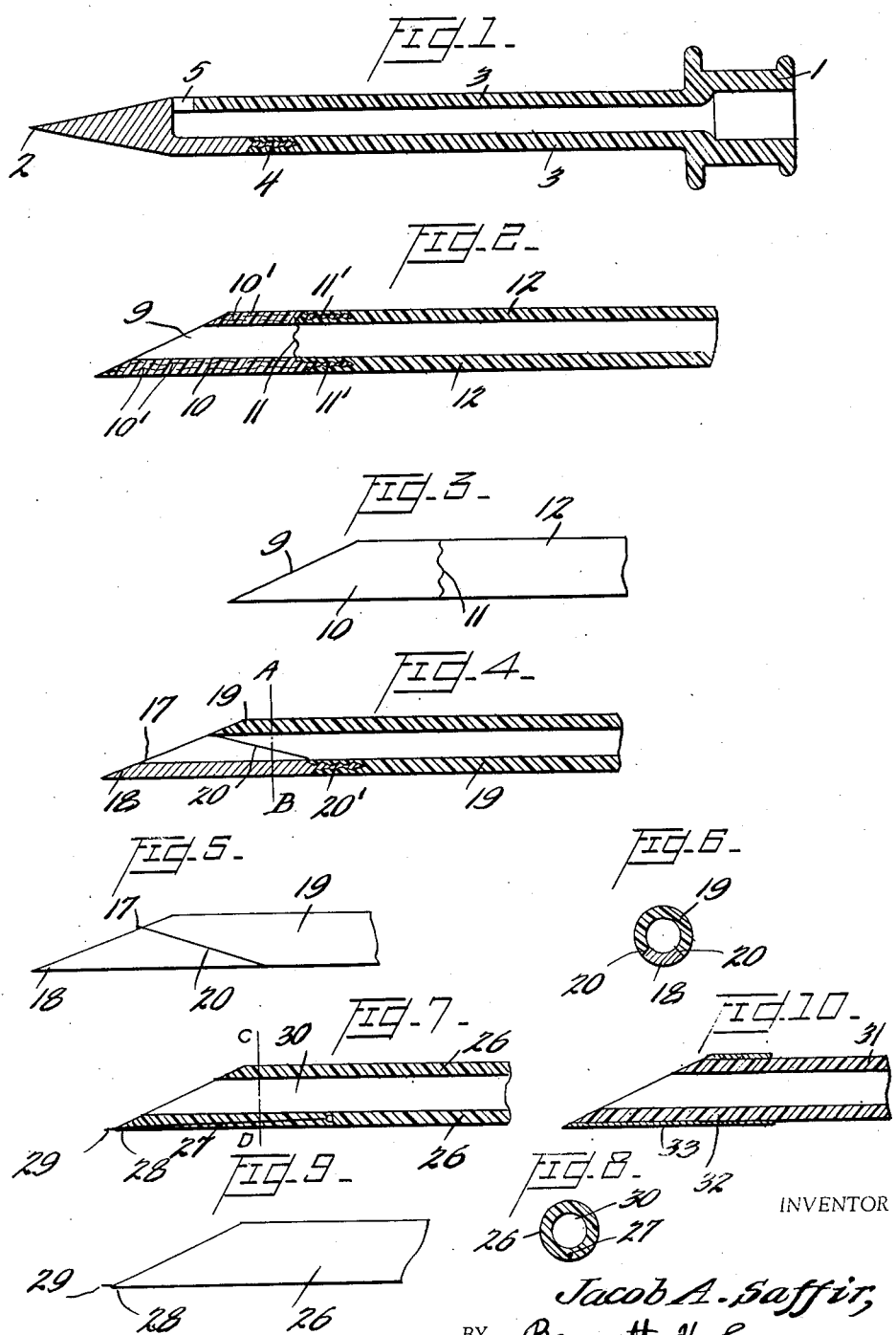

2,512,569

UNITED STATES PATENT OFFICE 2,512,569

HYPODERMIC NEEDLE

Jacob A. Saffir, Los Angeles, Calif.

Application September 26, 1947, Serial No. 776,291

4 Claims. (Cl. 128—221)

This invention relates to the art of hypodermic injection devices. More particularly it pertains to hypodermic needles or cannulae which are adapted to administer therapeutic substances by subcutaneous or intramuscular injection. Similarly it pertains to devices adapted for withdrawing samples from any portion of the animal system, such as, for example, blood from a vein or fluid from the abdomen.

In its preferred embodiment this invention is directed to a hypodermic cannula which affords an optimum condition of sharpness at its pointed or piercing end or piercing ends, for greater facility and ease in making an entrance into the skin and underlying tissues, which, of course, means less pain and discomfort to a patient during the injection and after the injection.

Heretofore the only materials that were considered for the manufacture of hypodermic needles were those that had the physical properties required for producing a sharp edge, such as steel or stainless steel, from which materials the greatest proportion of needles are made at the present time—and this in spite of the fact that these materials have some decidedly unsatisfactory physical properties. For example, brittleness, opacity, ready oxidization under certain conditions, and, usually, high cost of production which necessitates their being used over and over again.

When a needle is subject to reuse, it should be sterilized. This requires time. Frequently, too, the needle loses some of its sharpness, its point becoming duller with each use and sterilization. A dull needle causes considerable pain.

The needle described here is one which is quite inexpensive and can be discarded after every use, thus eliminating much pain, the possibility of infection from lack of sterilization or from incomplete sterilization, and affords the saving of much time for the physician or nurse using this invention.

A good example of the advantages of these features can be seen where the diabetic person has to give himself a daily injection of insulin. To use a fresh needle of the present art for each injection is beyond the normal means of most people. With each use and with each boiling the needle becomes more blunt. The daily injection becomes an ordeal with many painful after effects. By using this invention, the diabetic has an inexpensive needle he can afford to discard at will, whose sharpness is dependable and whose sterility may be insured at its source.

Brittleness, also, is a most annoying and often very serious matter in the hypodermic medication art. Needles break with great regularity and surgery is often required for the removal of fragments. Sometimes a piece of broken needle may be in such a position that it must be allowed to remain in situ because of the surgical difficulties involved in its removal.

Other metals have other disadvantages. An example of where a fine material for hypodermic needles has been practically abandoned because of inability to hold a sharp edge is pure platinum, as well as pure gold.

With this invention, a non-metallic substance that is not brittle and therefore not readily frangible, and which need not be opaque or readily oxidizable, can be used, even though it, by itself, may not be able to receive or maintain a sharp piercing or cutting edge.

This invention contemplates a cannula having a cutting or piercing edge of a material that can be sharply formed and a body portion of a softer, less frangible material.

Other objects, advantages, and features of the invention will become apparent from the following description read in connection with the accompanying drawings in which similar elements are designated by like numerals.

Figure 1 is a longitudinal section of a needle with a hub for attachment to a Luer type syringe.

Figure 2 is a longitudinal section of the injection end of a needle embodying this invention.

Figure 3 is a side elevation of the needle illustrated in Figure 2.

Figure 4 is a longitudinal section of the injection end of a needle showing another modification of the invention.

Figure 5 is a side elevation of the needle illustrated in Figure 4.

Figure 6 represents a cross sectional view taken along the line A—B in Figure 4.

Figure 7 is a longitudinal section of the injection end of a needle showing still another modification of the invention.

Figure 8 represents a cross sectional view taken along the lines C—D in Figure 7.

Figure 9 is a side elevation of the needle shown in Figure 7.

Figure 10 comprises a fragmentary longitudinal section of an additional modification of the invention.

Referring more particularly to the features of invention embodied in the modifications shown by the various figures of the drawing, the needle or cannula of Figure 1 has a hub 1 for attachment to a Luer type syringe and a sharply pointed injection end 2.

The body of the needle or cannula 3, as shown in Fig. 1, is made of a resin such as methyl methacrylate, styrene or a copolymer of methyl methacrylate or styrene or a co-polymer of methyl methacrylate and styrene. Alternatively, it can be made of one of the cellulose resins, or, of a co-polymer of vinyl chloride and vinyl acetate, or of any other resin having the rigidity and stability required for this purpose.

At 4, the needle tip 2 is imbedded in the resinous portion 3. An opening 5 is provided through which fluids travel. The sharply pointed tip 2 can be made of any hard metal such as stainless steel or the austenitic type of metal, or iridium. It can also be made of a synthetic resin which is hard enough to hold a good edge such as the allyl alcohol series of resins or the polyester type of resins or the phenol-formaldehyde group or the urea group and other types of resin.

The injection end of these needles, such as 2 in Figure 1 or 10 in Figure 2, etc., may also be made of the same resin as the body part by adding a hardening or reinforcing agent. A good example is glass fiber, a synthetic resin fiber, or any other type of fiber or filler which causes a change in the physical properties of the resin so that it will take a sharper, more pointed end adapted for piercing and penetrating the skin and the adjacent underlying tissue.

If fibers of glass are used, the length and dimensions of the fibers as well as the concentration may be subject to substantial variation, dependent upon the properties contemplated and the procedure involved in fabricating the cannula.

For optimum results concentration of glass fibers should not materially exceed 35% relative to the resin content. Optimum concentrations are from 3% to 25%. The optimum dimensions of the glass fibers include a length in the approximate range of $\frac{1}{32}''$ to $\frac{1}{64}''$ and a diameter in the approximate range of 0.00022'' to 0.00048.'' There may, of course, be a variety of other sizes and diameters used with fair results.

In Figure 2, the opening 9 of the cannula is on the injecting and piercing end 10 of the needle, the latter being designated as a resin or plastic and containing reinforcing material, such as glass fibers 10', dispersed therein. At 11 is the area of attachment of the harder sharpened portion 10 to the softer, more flexible portion 12, likewise derived from a plastic or resin.

Figure 3 illustrates the side elevation of the cannula illustrated in Figure 2. The sharpened anterior portion 10 joins the softer body portion 12, through the expedient of prongs 11', thereby providing the said jointure 11.

In Figure 4 a cannula is illustrated whose piercing end 17 is beveled considerably and the most forward end 18 is of hard material adapted for and sharpened to a fine point. This hardened portion is embedded in the plastic or resin body 19 of the cannula through the expedient of prongs 20', thereby providing the jointure 20 between the said body 19 and the needle end 17, 18 which is shown as metal.

Figure 5 is a side elevation of the needle shown in Figure 4, indicating the approximate positions of the metallic end 18 and resinous portion 19 and the junction area 20.

Figure 6 illustrates a cross section of this same needle shown in Figures 4 and 5, the cross section being along the lines A—B in Figure 4. The metallic or hardened portion 18 joins the softer resinous portion 19 at the junction point 20.

Figure 7 is a needle or cannula whose walls 26 are composed of a resin. Imbedded in one of the walls at 27 is a thin hard wire-like body which protrudes through the extreme forward portion 28 of the bevel of the needle and comes to a very sharp piercing point 29. This point is so fine and sharp that it easily penetrates the skin and starts a small opening through which the rest of the needle can expediently follow.

Figure 8 is a cross section taken through the line C—D in Figure 7. Here is illustrated the imbedded member 27 in relationship to the lumen 30 of the needle and the walls 26.

Figure 9 is a side elevation of the same needle shown in Figures 7 and 8. Slightly protruding from the extreme forward point in the bevel of the needle is the sharp piercing means 29.

The tip of the needle can also be reinforced by electroplating. Thus a plastic cannula or needle may have its piercing point reinforced by electro-deposition of a sufficient amount of metal to give the piercing tip the desired amount of hardness for tissue penetration. Accordingly the pointed end of the needle comprising this modification is a plastic, such as a synthetic resin, reinforced by metal electrolytically deposited thereon. However as indicated hereinabove, the end portion of the needle may comprise other reinforcing expedients attainable from materials other than a synthetic resin alone, as illustrated by an organic synthetic resin containing glass fibers or other suitable filler material.

Thus in the modification of Fig. 10, the hollow tubular body portion 31 of the needle comprises a resin or plastic, and the end 32 thereof is similarly shown as being of resin or plastic derivation. As a reinforcing expedient, said piercing end 32 is provided with a metal coating 33, which is desirably electroplated thereon.

It is understood that where a needle or cannula is provided with two piercing ends, both these ends may incorporate these teachings.

Pursuant to the drawings pertaining to the various modifications of the invention, the needle may comprise a hollow substantially rigid tubular body desirably of uniform cross section, with the end portion thereof, which may comprise a separate member, being permanently attached thereto and tapering in an oblique direction from the needle outlet to the sharp edge or piercing and penetrating point thereof. It will however be understood that the details and characteristics pertaining to the needle may be subject to a reasonable element of variation within the purport and scope of the invention.

While I have described my invention in accordance with desirable embodiments it is obvious that many changes may be made in the details of construction and in the combination of parts and materials, without departing from the spirit of the invention as defined in the following claims.

I claim:

1. An integral hypodermic needle of uniform cross section except for the extreme end thereof comprising a hollow substantially rigid tubular body of a plastic material, said needle having an end portion of material other than plastic alone and being harder than said tubular body, said end portion being permanently affixed to the hollow tubular body and provided with a sharp edged point adapted to pierce and penetrate the skin and adjacent underlying tissue, the inner surface of the said end portion being in flush alignment with the inner surface of the said hollow tubular body, said end portion, at least in part, tapering in an oblique direction from the needle outlet to the piercing and penetrating point.

2. An integral hypodermic needle as in claim 1, wherein the hollow tubular body is of a synthetic resinous material, and the end portion comprising the sharp edged point, adapted to pierce and penetrate the skin, is of metal.

3. An integral hypodermic needle as in claim 1, wherein the hollow tubular body is of a synthetic resinous material, and the end portion comprising the sharp edged point, adapted to pierce and penetrate the skin, is of a relatively hard synthetic resinous material containing glass fibers therein as a reinforcing agent.

4. An integral hypodermic needle as in claim 1, wherein the hollow tubular body is of a synthetic resinous material, and the end portion comprising the sharp edged point, adapted to pierce and penetrate the skin, is of a relatively hard synthetic resinous material, said resinous end portion having its piercing point reinforced by metal electrolytically deposited thereon.

JACOB A. SAFFIR.

REFERENCES CITED

The following references are of record in the file of this patent:

UNITED STATES PATENTS

| Number | Name | Date |
| --- | --- | --- |
| 387,454 | Siegenthaler | Aug. 7, 1888 |
| 722,203 | Brooke | Mar. 10, 1903 |
| 1,470,981 | Ingalls | Oct. 16, 1923 |